United States Patent [19]

Cullimore

[11] Patent Number: 5,117,901
[45] Date of Patent: Jun. 2, 1992

[54] HEAT TRANSFER SYSTEM HAVING A FLEXIBLE DEPLOYABLE CONDENSER TUBE

[76] Inventor: Brent A. Cullimore, 49 Dawn Heath Cir., Littleton, Colo. 80127

[21] Appl. No.: 649,603

[22] Filed: Feb. 1, 1991

[51] Int. Cl.⁵ .................... F28D 15/02; B64G 1/50
[52] U.S. Cl. ........................... 165/86; 165/41; 165/104.26; 165/104.27; 244/163
[58] Field of Search ............... 165/41, 86, 46, 104.26, 165/104.27; 244/163

[56] References Cited

U.S. PATENT DOCUMENTS

| | | | |
|---|---|---|---|
| 3,152,260 | 10/1964 | Cummings | 244/173 |
| 4,040,478 | 8/1977 | Pogson et al. | 165/46 |
| 4,765,396 | 8/1988 | Seidenberg | 165/104.26 |
| 4,869,313 | 9/1989 | Fredley | 165/104.26 |
| 5,016,705 | 5/1991 | Bahrle et al. | 165/104.26 |

*Primary Examiner*—Albert W. Davis, Jr.

[57] ABSTRACT

A two-phase capillary pumped loop heat transfer system adapted primarily for use on space vehicles, includes a wickless condenser tube which receives gaseous phase working fluid from the evaporator capillaries, rejects heat from the working fluid to a heat sink (e.g. outer space) and thereby converts the gaseous phase working fluid to its liquid phase, and returns the liquid phase working fluid to the evaporator to complete the thermal cycle. A portion of the condenser tube is supported by a rigid radiator structure external to the spacecraft. At least a portion of the condenser tube is deformable to permit the radiator structure to be deployed from a first predetermined position to a second predetermined position with respect to the spacecraft. The deformable segment of the condenser tube can be formed into a helical coil used as a spring to assist deployment of the radiator panel.

7 Claims, 4 Drawing Sheets

HEAT TRANSFER SYSTEM HAVING A FLEXIBLE DEPLOYABLE CONDENSER TUBE

BACKGROUND OF THE INVENTION

1. Field of the Invention

The present invention relates generally to the of heat transfer systems. More specifically, the present invention discloses a thermal management system using a capillary pumped loop in which the condenser tube is deformable and/or deployable.

2. Statement of the Problem

Management of thermal loads aboard space Vehicles presents a unique combination of problems. Equipment within the space vehicle generates excess heat which must be dissipated. This is typically accomplished by means of a working fluid which accepts heat generated within the space vehicle, and is then circulated through external radiator panels where the heat is rejected by radiative heat transfer to outer space. In the simplest conventional arrangement, the working fluid remains in one phase (i.e. liquid) and is circulated by a mechanical pump. However, this arrangement has disadvantages in terms of the added weight of the pump and liquid coolant; power requirements to drive the pump; relatively coarse temperature control of the electronics and other thermal energy sources within the spacecraft; large temperature drops from source to sink which adversely affect total spacecraft weight and volume; and increased difficulty of system integration due to the interdependence of loads (i.e. on/off, up/downstream, etc.).

Other considerations arise in providing for deployment of radiator panels after orbit is achieved. Conventional designs use various types of bellows or seals at the flexure joints connecting the radiator tubes with the remainder of the heat management system located within the space vehicle. These seals and bellows may be subject to leakage or failure, with potentially catastrophic results.

Heat pipes have the potential of addressing some of these shortcomings. A conventional heat pipe is a self-contained heat transfer device with no moving parts. Heat is transported from one end of the heat pipe to the other by evaporation and condensation of an internal working fluid. Substantially the entire length of the heat pipe is filled either with a wicking material or capillary passages. All motion of the working fluid is accomplished by capillary pumping in the heated zone. In traditional heat pipes, liquid and vapor flow in opposite directions within a common tube. Liquid flows opposite the vapor in a generally linear geometric arrangement. However, due to technical constraints associated with maintaining the integrity of the wicking material or capillaries between the ends of the heat pipe, a reliable design for a flexible heat pipe has not been achieved. In particular, prior efforts in achieving a flexible heat pipe have relied upon complex passages for both liquid and vapor flow, or flexible lines such as welded bellows joints with an internal screen tube. Perhaps more importantly, such designs must contend with the difficult fabrication of a transition wick at the joint, and imply the use of an arterial (composite wick) heat pipe which is inherently less reliable than a non-composite wick pipe and cannot be easily reprimed in-orbit and under load. Therefore, conventional heat pipes cannot be used in association with a deployable radiator panel.

Two-phase heat transfer systems, and in particular, capillary pumped loops have substantial advantages for space applications. In contrast to heat pipes, liquid and vapor flows are in separate tubes and evaporation and condensation occur in distinct components in a CPL. The concept of a capillary pumped loop ("CPL") was developed in the mid 1960's by F. J. Stenger at the NASA Lewis Research Center (F. J. Stenger, "Experimental Feasibility Study of Water-Filled Capillary-Pumped Heat Transfer Loops," NASA TM X-1310, NASA Lewis Research Center, Cleveland, Ohio, 1966). Development continued at the NASA Goddard Space Flight Center with construction of a number of CPL's beginning in the late 1970's. Several of these systems have been developed at the Goddard Space Flight Center and one has twice been flown on the space shuttle to demonstrate micro-gravity operation. The basic operation of a CPL involves pumping a working fluid through the heat transfer system with capillary forces developed in a wick material located inside the evaporator. A CPL has no moving parts and is self-controlling, in that the flow rate of working fluid through the evaporator will automatically change to match the thermal load. CPL's are ideal for managing heat loads in spacecraft where vibrations, such as those from a mechanical pump, are detrimental. In addition, CPL's offer high reliability due to the absence of moving parts. They offer automatic heat load sharing if a number of evaporators are used in parallel. Phase separation and flow distribution are automatically controlled since the flow rate through each evaporator is related directly to the rate of evaporation at the wicking surface inside. Consequently, adjacent evaporators can operate at significantly different heat input rates, but both will have only working fluid vapor at their exits.

U.S. Pat. No. 3,152,260 of Cummings discloses a solar power plant in which coolant is circulated through radiator panels 30 to dissipate excess heat. Each panel have flexible loops 34 connected to the panel conduits to circulate the coolant, as shown most clearly in FIGS. 4 and 5. These flexible loops act as springs which cause the panel sections 30 to deploy to their outstretched positions after the satellite has achieved orbit.

3. Solution To the Problem

None of the prior art references show a CPL having a deformable wickless condenser tube. This arrangement combines the thermodynamic advantages of a CPL with the physical advantages of flexible or deformable condenser tubes that enable radiator panels to be deployed without the need for bellows or seals.

SUMMARY OF THE INVENTION

This invention provides a two-phase capillary pumped loop heat transfer system adapted primarily for use on space vehicles, in which a wickless condenser tube receives gaseous phase working fluid from the evaporator capillaries, rejects heat from the working fluid to a heat sink (e.g. outer space) and thereby converts the gaseous phase working fluid to its liquid phase, and returns the liquid phase working fluid to the evaporator to complete the thermal cycle. A portion of the condenser tube is supported by a rigid radiator structure external to the spacecraft. At least a portion of the condenser tube is deformable to permit the radiator structure to be deployed from a first predetermined position to a second predetermined position with respect to the spacecraft. The deformable segment of the condenser tube can be formed into a helical coil used as a spring to assist deployment of the radiator panel.

A primary object of the present invention is to provide a thermal management system suitable for use in a space vehicle, in which the lack of seals and bellows in the present invention minimizes the risk of leakage or system failure.

Another object of the present invention is to provide a heat transfer system having condenser leads that can be deformed, thereby providing a degree of mechanical isolation between the evaporator and the radiator panel, and also simplifying deployment of the radiator panel.

Yet another object of the present invention is to provide a condenser and radiator structure having minimal complexity and a relatively low cost of fabrication.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1A:
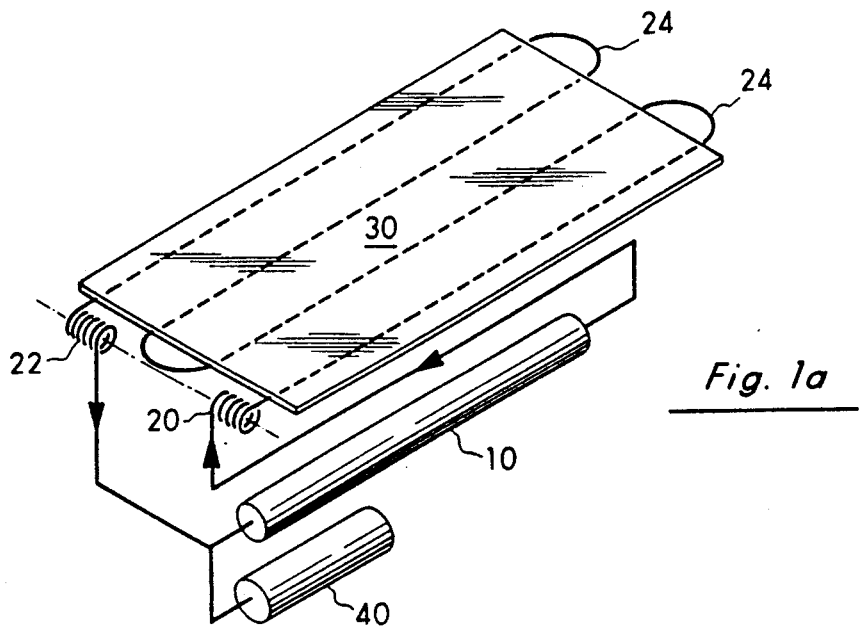
FIG. 1a is a simplified schematic diagram of the present invention in which the radiator panel is shown in its stowed position.
Figure 1B:
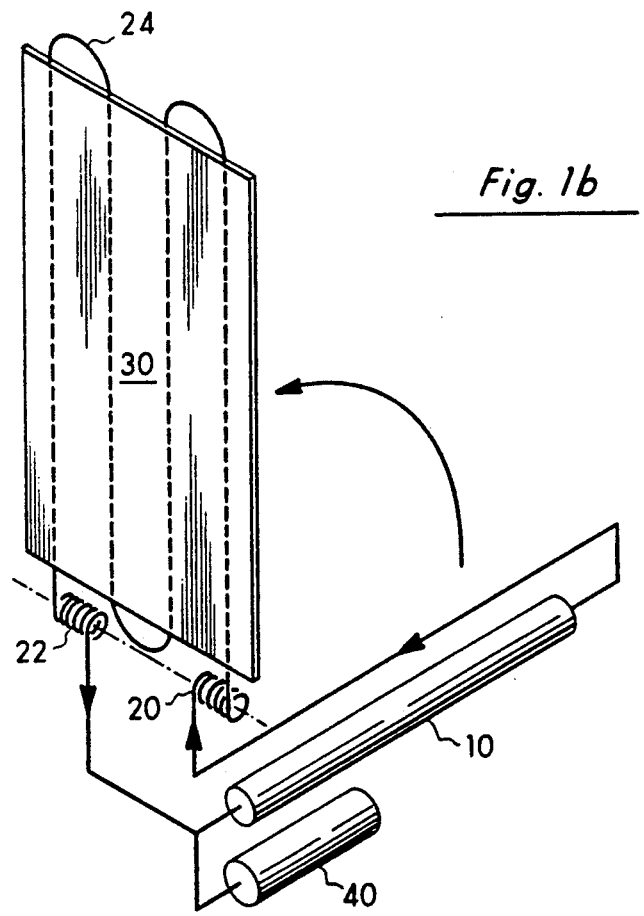
FIG. 1b is a simplified schematic diagram corresponding to FIG. 1a in which the radiator panel is in its deployed position.
Figure 2:
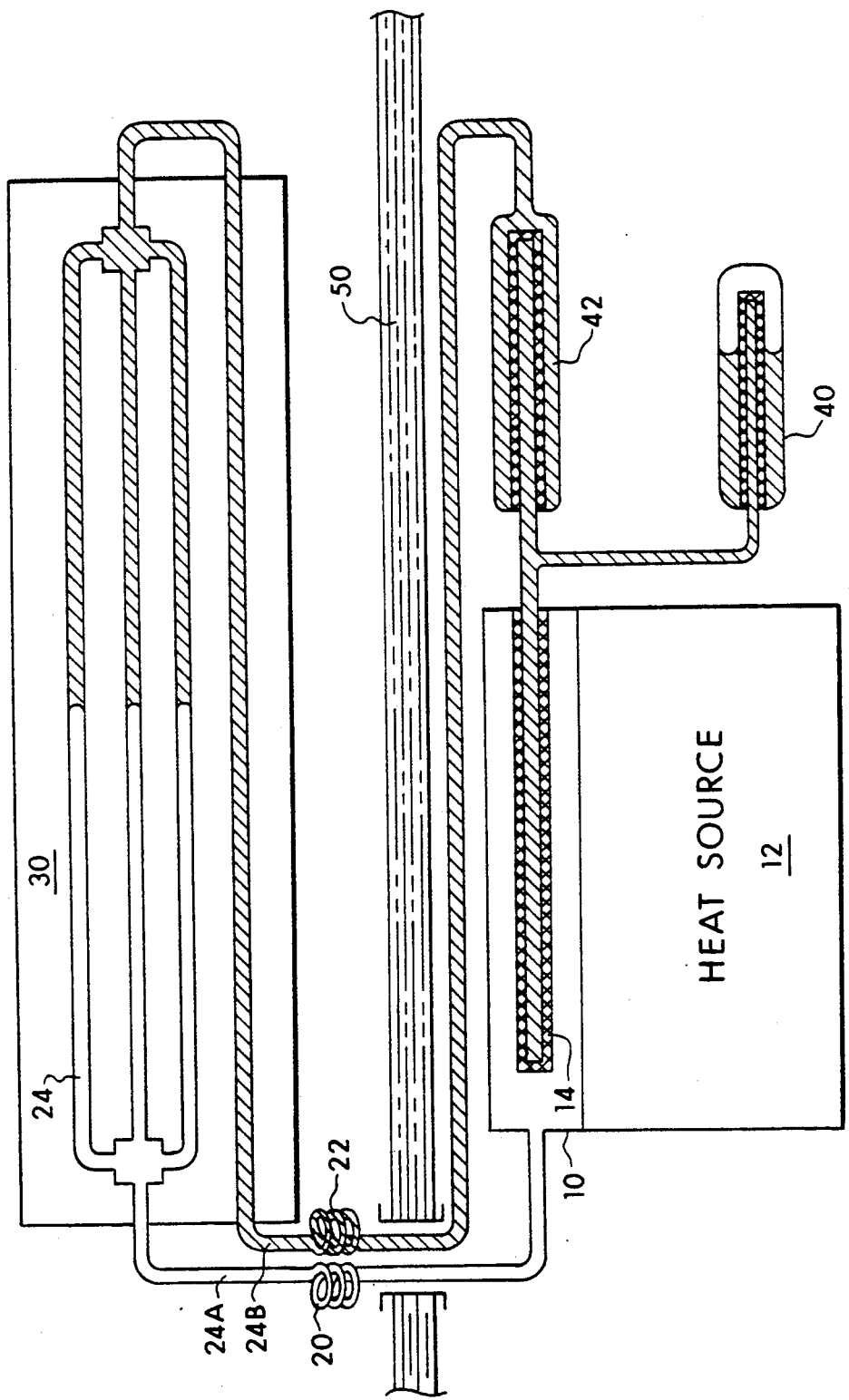
FIG. 2 is a simplified schematic diagram showing the path of the working fluid through the major components of the present invention.
Figure 3:
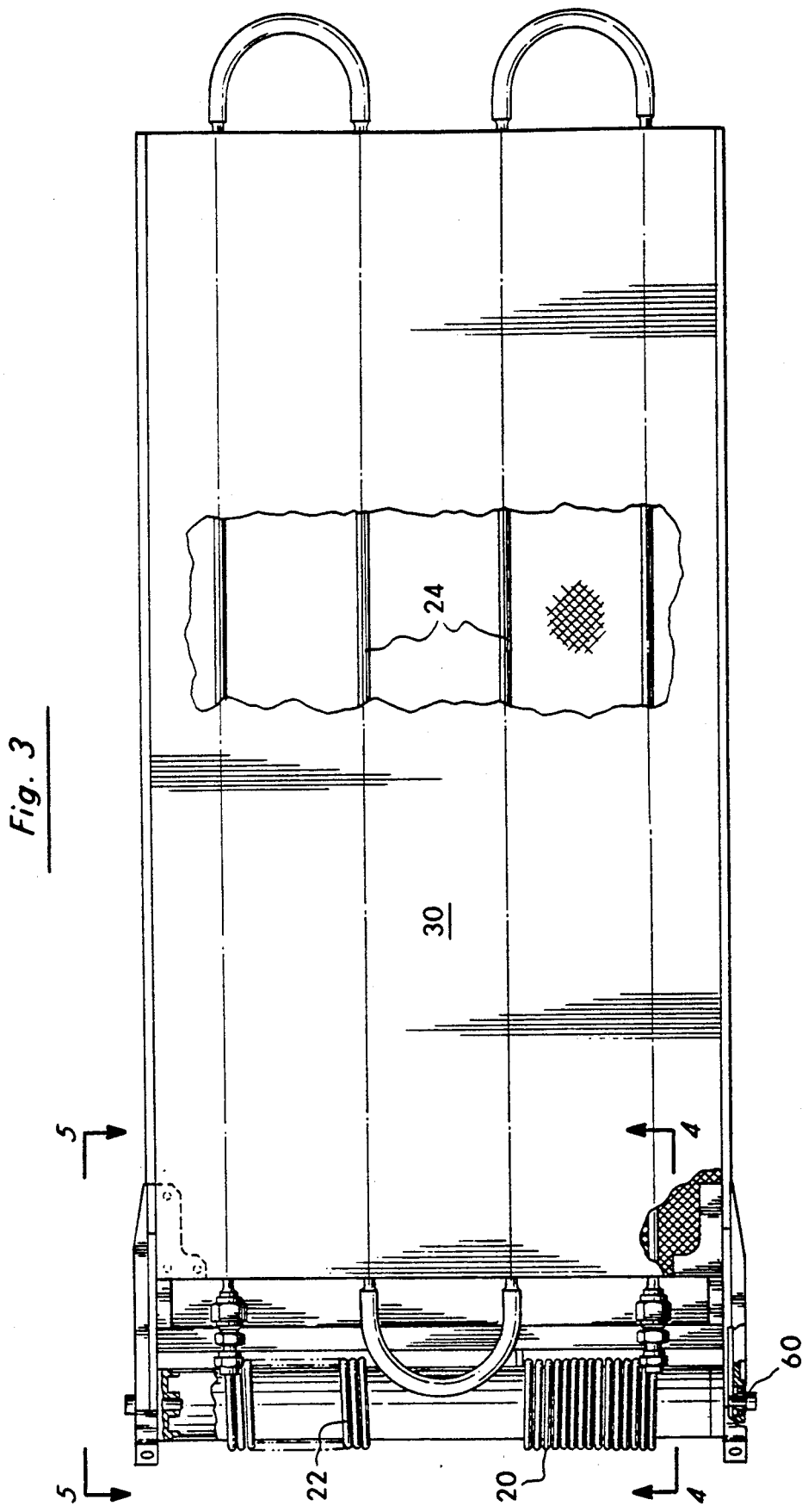
FIG. 3 is a top view of the radiator panel, hinge assembly, and the coiled segments of the condenser tube used to deploy the radiator panel.

The present invention involves a two-phase capillary pumped loop thermal cycle in which the condenser tube can be deformed to permit deployment of a radiator panel. Turning to FIGS. 1a and 1b, schematic diagrams of the present invention are provided showing the radiator panel 30 in its stowed and deployed states, respectively. The basic components of the thermodynamic cycle are shown in FIG. 2. Heat is absorbed from a heat source 12 by the evaporator 10. When used in a spacecraft, the heat source 12 is typically the electrical equipment, people, and other thermal sources contained within the spacecraft 50. A working fluid, such as ammonia or water, having a liquid phase and a vapor phase is used in the present invention. In FIG. 3, those portions of the thermal cycle in which the working fluid is liquid are indicated by diagonal lines. Liquid-phase working fluid is introduced at the inlet of the evaporator 10 (i.e. the right side of the evaporator 10 in FIG. 2). The interior of the evaporator contains a structure of wicking material 14 which functions as a multitude of capillaries in parallel with one another. The working fluid is drawn into these capillaries and is converted to its vapor phase by heat from the heat source 12. The working fluid vapor exits from the capillaries and from the outlet of the evaporator 10 into the condenser tube 24a. The condenser tube 24 rejects heat from the working fluid to a heat sink (e.g. outer space), thereby causing the working fluid to condense to liquid. As shown in FIGS. 1a, 1b, and 2, the condenser tube can be attached to and supported by a rigid radiator structure 30 to enhance the structural and heat transfer characteristics of the system. The liquid-phase working fluid is returned by the other end of the condenser tube 24b to the inlet of the evaporator 10, as shown in FIG. 2. Circulation of the working fluid is driven by the pressure head (up to 0.5 psid, or 2 ft. head of ammonia at room temperatures) created across the capillaries 14 in the evaporator 10 by capillary forces. Corresponding pressure drops are created in the remainder of the thermodynamic cycle by frictional losses within the tubing and condensation of the working fluid in the condenser tube. This thermal cycle is inherently self-regulating in that the flow rate of coolant will automatically increase to match increased thermal loads placed on the evaporator 10.

Optionally, a reservoir 40 can be added to the return side of the condenser tube 24b to hold a quantity of liquid working fluid. If a thermostatically controlled heater is added to the reservoir 40, the system can be operated in a "variable conductance" mode, wherein the thermal energy source (e.g. the electronics within the spacecraft) are maintained a a given temperature independent of the evaporator load or condenser environmental variations. This serves to isolate the evaporator from a cold environment and minimize unnecessary payload heating requirements. The reservoir 40 can also be used to initiate and restart the system by priming the evaporator capillaries.

A gas trap 42 can also be added to the return side of the condenser tube 24b to collect working fluid vapor and other noncondensible gases, and to prevent them from entering the inlets to the evaporator capillaries. A secondary function of the gas trap 42 may be regulation of the loop temperature, similar to the function of the reservoir. This secondary function may be assumed intermittently or continually depending upon the exisence and capacity of the reservoir, and other design permutations. A pump can be used to boost the flow of working fluid from the return side of the condenser tube 24b to the evaporator 10.

Unlike conventional heat pipes, the condenser tube 24 is a simple pipe, with no wick or arterials. With the exception of the evaporator capillaries, the remainder of the system is largely comprised of simple piping. This design also causes the system to act as a thermal diode. The absence of a wick in the condenser tube 24 prevents significant transport of energy in the reverse direction (from the condenser 24 to the evaporator 10). The system effectively shuts down if the condenser 24 becomes warmer than the evaporator 10.

The present invention extends beyond a conventional capillary-pumped loop system by recognizing that the pressure increase provided by the capillaries is sufficiently large to permit use of a small diameter condenser tube having a relatively long length. In particular, one or more segments of the condenser tube can be made to flex or deform to permit at least a limited range of relative motion between the evaporator 10 and the remainder of the condenser tube 24. In cases where the condenser tube is supported by a relatively rigid radiator panel 30, these deformable segments of the condenser tube 24 permit the entire radiator assembly to be moved relative to the evaporator 10. For example, FIGS. 1a and 1b show the addition of two helically-wound coils 20 and 22 as segments of the condenser tube 24. The first coil is added to the vapor side 24a of the condenser tube 24, and the second coil is added to the liquid return side 24b of the condenser tube 24, as shown in FIG. 2. As shown in FIGS. 1a and 1b, the coils 20 and 22 can be coaxially aligned to permit rotation of the radiator assembly 30 about an axis. These coils 20 and 22 can also be used to provide additional degrees of freedom of motion for the radiator assembly 30, e.g. by axial compression or extension of the coils, or by torsional deformation about an axis perpendicular to the axis of the coils. The coils can be pre-stressed to act as springs to assist in deployment of the radiator assembly 30 from its stowed position shown in FIG. 1a to its deployed position shown in FIG. 1b. Additional springs can be provided to aid in deployment of the radiator panel 30, if necessary. Additionally, an actuator (such as a catch, latch, or solenoid) can be used to trigger deployment of the radiator panel at the desired time. It should be noted that the condenser tubes can be formed into any of a number of alternative shapes (e.g. spirals, loops, accordian folds, etc.) to permit motion between the radiator assembly 30 and the evaporator 10, or to provide a degree of mechanical isolation between the radiator panel 30 and the remainder of the system.

As previously mentioned, the present invention is intended primarily for use as a thermal management system for spacecraft. In this application, the evaporator 10 and reservoir 40 are located within the spacecraft, while the radiator assembly 30 is external to the spacecraft. FIG. 2 shows the relative position of the external shell 50 of the spacecraft between the evaporator 10 and the radiator assembly 30. The corresponding view shown in FIG. 1a demonstrates the radiator panel 30 in its stowed position adjacent to the spacecraft prior to achieving orbit. FIG. 1b shows the radiator panel 30 in its deployed position perpendicular to the surface of the spacecraft to maximize radiative heat transfer to outer space.

Figure 4:
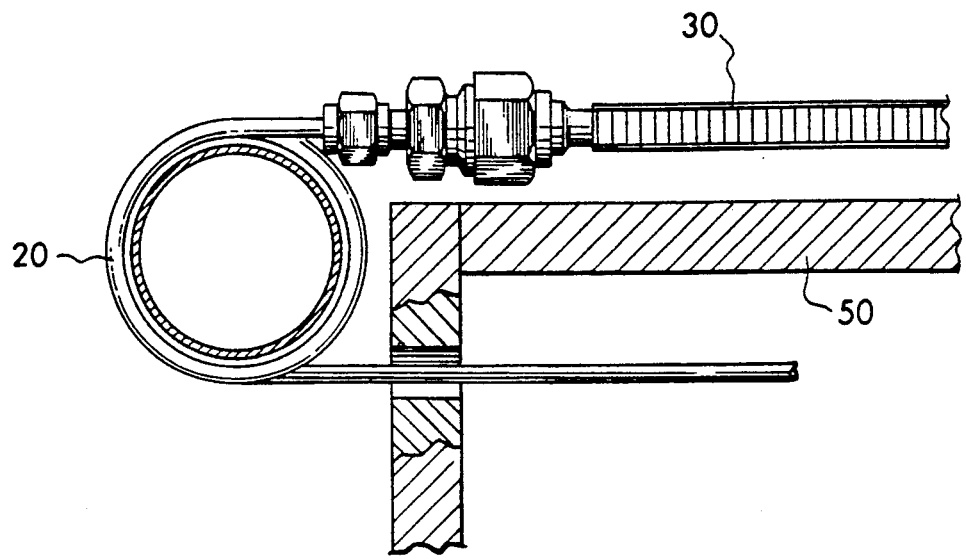
FIG. 4 is a cross-sectional view of a portion of the condenser tube and radiator assembly shown in FIG. 3.
Figure 5:
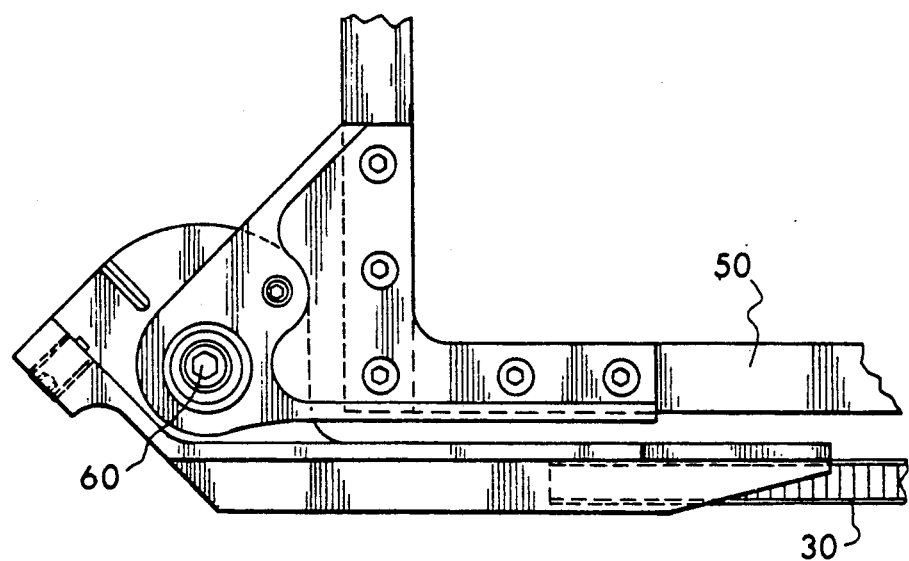
FIG. 5 is an end view of a portion of the condenser tube and radiator assembly shown in FIG. 3.

FIGS. 3-5 provide further details of the condenser tube coils 20 and 22 and the hinge mechanism 60 used to deploy the radiator panel 30. Coils 20 and 22 are helically wound around a substantially tubular member at the base of the radiator assembly 30. An additional spring can be incorporated into the hinge mechanism 60 to assist in deployment of the radiator panel 30. As shown in FIG. 5, the hinge mechanism contains a stop which defines the maximum angle of deployment for the radiator panel 30 with respect to the external shell 50 of the spacecraft.

Additionally, the radiator panel 30 can be constructed of a plurality of substructures that move relative to one another during deployment of the radiator. For example, the radiator can be made of a series of smaller panels each connected to adjacent panels by hinges to create a folding accordian-like structure. The condenser tube 24 can be coiled at each hinge similar to that shown in FIGS. 3-5.

The above disclosure sets forth a number of embodiments of the present invention. Other arrangements or embodiments, not precisely set forth, could be practiced under the teachings of the present invention and as set forth in the following claims.

I claim:

1. A closed-loop heat transfer system adapted to transfer heat from a heat source within a housing to an external heat sink by means of a working fluid having a liquid phase and a gaseous phase, said heat transfer system comprising:

an evaporator within said housing having a plurality of capillaries adapted to accept heat from said heat source, each of said capillaries having a first end and a second end, said first ends receiving a flow of said working fluid, with heat from said heat source causing said working fluid flowing through said capillaries to convert to said gaseous phase which exits through said second ends;

a radiator structure external to said housing;

a hinge permitting said radiator structure to rotate about a predetermined axis with respect to said housing; and an elongated wickless condenser tube adapted to reject heat from said working fluid to said heat sink and thereby convert said gaseous phase working fluid to its liquid phase, said condenser tube having:
   (a) a first end sealed in fluid communication with said evaporator, adapted to receive said gaseous phase working fluid exiting from said second ends of said capillaries;
   (b) a radiator segment external to said housing, secured to said radiator structure;
   (c) a first helically coiled segment between said first end and said radiator segment;
   (d) a second end adapted to return said liquid phase working fluid to said first ends of said capillaries; and
   (e) a second helically coiled segment between said radiator segment and said second end; said first and second coiled segments being wound about said axis to permit said radiator structure to be deployed from a first predetermined position to a second predetermined position with respect to said housing by deformation of said coiled segments.

2. The heat transfer system of claim 1 wherein at least one of said coiled segments is pre-stressed to act as a spring for deployment of said radiator structure from said first position to said second position.

3. The heat transfer system of claim 2 further comprising actuating means adapted to trigger deployment of said condenser tube from said first position to said second position.

4. The heat transfer system of claim 1 further comprising a pump adapted to boost the flow of said working fluid from said second end of said condenser tube to said first ends of said evaporator capillaries.

5. The heat transfer system of claim 1 further comprising a reservoir adapted to contain a quantity of said liquid phase working fluid returned by said second end of said condenser tube.

6. The heat transfer system of claim 1 further comprising a gas trap adapted to prevent working fluid vapor and noncondensible gases from entering said inlets of said evaporator capillaries.

7. The heat transfer system of claim 1 wherein said radiator structure comprises a plurality of substructures capable of relative motion with respect to one another as said radiator structure is deployed from said first predetermined position to said second predetermined position.

* * * * *